United States Patent
Thapliya et al.

(10) Patent No.: US 9,654,364 B2
(45) Date of Patent: May 16, 2017

(54) BANDWIDTH MEASURING DEVICE AND NON-TRANSITORY COMPUTER READABLE MEDIUM

(71) Applicant: FUJI XEROX CO., LTD., Tokyo (JP)

(72) Inventors: Roshan Thapliya, Yokohama (JP); Chaoxin Hu, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 49 days.

(21) Appl. No.: 14/730,755

(22) Filed: Jun. 4, 2015

(65) Prior Publication Data

US 2015/0271042 A1  Sep. 24, 2015

Related U.S. Application Data

(63) Continuation of application No. PCT/JP2013/074042, filed on Sep. 6, 2013.

(30) Foreign Application Priority Data

Feb. 27, 2013  (JP) ................. 2013-037061

(51) Int. Cl.
*H04L 12/26* (2006.01)
*H04L 12/801* (2013.01)
(Continued)

(52) U.S. Cl.
CPC ...... *H04L 43/0864* (2013.01); *H04L 43/0841* (2013.01); *H04L 43/0894* (2013.01);
(Continued)

(58) Field of Classification Search
CPC ............ H04L 43/0864; H04L 43/0841; H04L 43/0894; H04L 47/11; H04L 69/16; H04L 84/042
See application file for complete search history.

(56) References Cited

U.S. PATENT DOCUMENTS

| | | | | |
|---|---|---|---|---|
| 5,130,986 A | * | 7/1992 | Doshi | .................... H04L 47/10 370/231 |
| 6,078,564 A | * | 6/2000 | Lakshman | ............ H04L 1/1635 370/235 |
| 6,272,148 B1 | * | 8/2001 | Takagi | .................. H04L 1/1858 370/469 |

(Continued)

FOREIGN PATENT DOCUMENTS

JP  2007-534194 A  11/2007
JP  2010-041326 A  2/2010

OTHER PUBLICATIONS

Sasaki, Takayuki et al., "A Technique of Adaptive Bandwidth Estimation for SACK Based TCP Over Wireless Network," the IEICE Transactions-B, vol. J87-B, No. 10, pp. 1657-1667, Oct. 2004.

(Continued)

*Primary Examiner* — Kevin Mew
(74) *Attorney, Agent, or Firm* — Oliff PLC

(57) ABSTRACT

A mobile terminal obtains a measurement value of a round-trip time in a communication channel used for communication with a server and a measurement value of a packet loss ratio in the communication channel (S502 and S503). Then, the mobile terminal determines whether or not a retransmission timeout is occurring in the server (S504, S505, and S506). If a retransmission timeout is occurring in the server, the mobile terminal calculates an estimate value of the bandwidth in the communication channel by using a special throughput equation including a timeout time (S507). On the other hand, if a retransmission timeout is not occurring in the server, the mobile terminal calculates an estimate value of the bandwidth by using a normal throughput equation which does not include a timeout time.

10 Claims, 8 Drawing Sheets

(51) Int. Cl.
*H04L 29/06* (2006.01)
*H04W 84/04* (2009.01)

(52) U.S. Cl.
CPC .............. *H04L 47/11* (2013.01); *H04L 69/16* (2013.01); *H04W 84/042* (2013.01)

(56) References Cited

U.S. PATENT DOCUMENTS

| | | | | |
|---|---|---|---|---|
| 8,462,778 | B2* | 6/2013 | Henocq | H04L 41/0896 370/229 |
| 8,570,168 | B2* | 10/2013 | Logan | H04Q 9/00 340/539.32 |
| 2003/0018794 | A1* | 1/2003 | Zhang | H04L 29/06 709/231 |
| 2005/0036511 | A1 | 2/2005 | Baratakke et al. | |
| 2006/0227708 | A1* | 10/2006 | Tan | H04L 1/187 370/235 |
| 2007/0115814 | A1* | 5/2007 | Gerla | H04L 1/0002 370/230 |
| 2008/0186863 | A1 | 8/2008 | Baratakke et al. | |
| 2009/0180384 | A1* | 7/2009 | Ansari | H04L 47/10 370/235 |
| 2009/0185542 | A1* | 7/2009 | Zhang | G01D 3/00 370/338 |
| 2010/0157795 | A1* | 6/2010 | Konishi | H04L 12/1836 370/230 |
| 2010/0246602 | A1* | 9/2010 | Barreto | H04L 49/90 370/466 |
| 2010/0250767 | A1* | 9/2010 | Barreto | H04L 69/16 709/231 |
| 2013/0263200 | A1* | 10/2013 | Li | H04L 47/38 725/116 |

OTHER PUBLICATIONS

Apr. 12, 2016 Office Action issued in Japanese Patent Application No. 2013-037061.
Dec. 3, 2013 International Search Report issued in international Patent Application No. PCT/JP2013/074042.

* cited by examiner

BANDWIDTH MEASURING DEVICE AND NON-TRANSITORY COMPUTER READABLE MEDIUM

CROSS-REFERENCE TO RELATED APPLICATIONS

This is a continuation of International Application No. PCT/JP2013/074042 filed on Sep. 6, 2013, and claims priority from Japanese Patent Application No. 2013-037061, filed on Feb. 27, 2013.

BACKGROUND

Technical Field

The present invention relates to a bandwidth measuring device and a non-transitory computer readable medium.

SUMMARY

According to an aspect of the present invention, there is provided a bandwidth measuring device which communicates, via a public network, with a server which distributes a packet set by changing a window size of a congestion window, the packet set being constituted by packets, the number of which is equivalent to the window size, including: a RTT obtaining unit that obtains a measurement value of a round-trip time in a communication channel used for communication between the bandwidth measuring device and the server; a loss ratio obtaining unit that obtains a measurement value of a packet loss ratio in the communication channel; a receiving unit that receives the packet set distributed from the server; a returning unit that returns, when the packet set distributed from the server is received, an acknowledgement response packet corresponding to each of packets included in the packet set to the server; a first determining unit that determines whether or not a retransmission timeout occurrence condition for determining whether or not a retransmission timeout is occurring is satisfied; and a calculating unit that calculates an estimate value of a bandwidth in the communication channel, on the basis of a determination result of the first determining unit, wherein, when the retransmission timeout occurrence condition is satisfied, the calculating unit calculates the estimate value of the bandwidth by using a first mathematical equation including the measurement value obtained by the RTT obtaining unit, the measurement value obtained by the loss ratio obtaining unit, a given retransmission timeout time, and a data size per packet.

BRIEF DESCRIPTION OF THE DRAWINGS

Exemplary embodiment(s) of the present invention will be described in detail based on the following figures, wherein.

DETAILED DESCRIPTION

Figure 1:
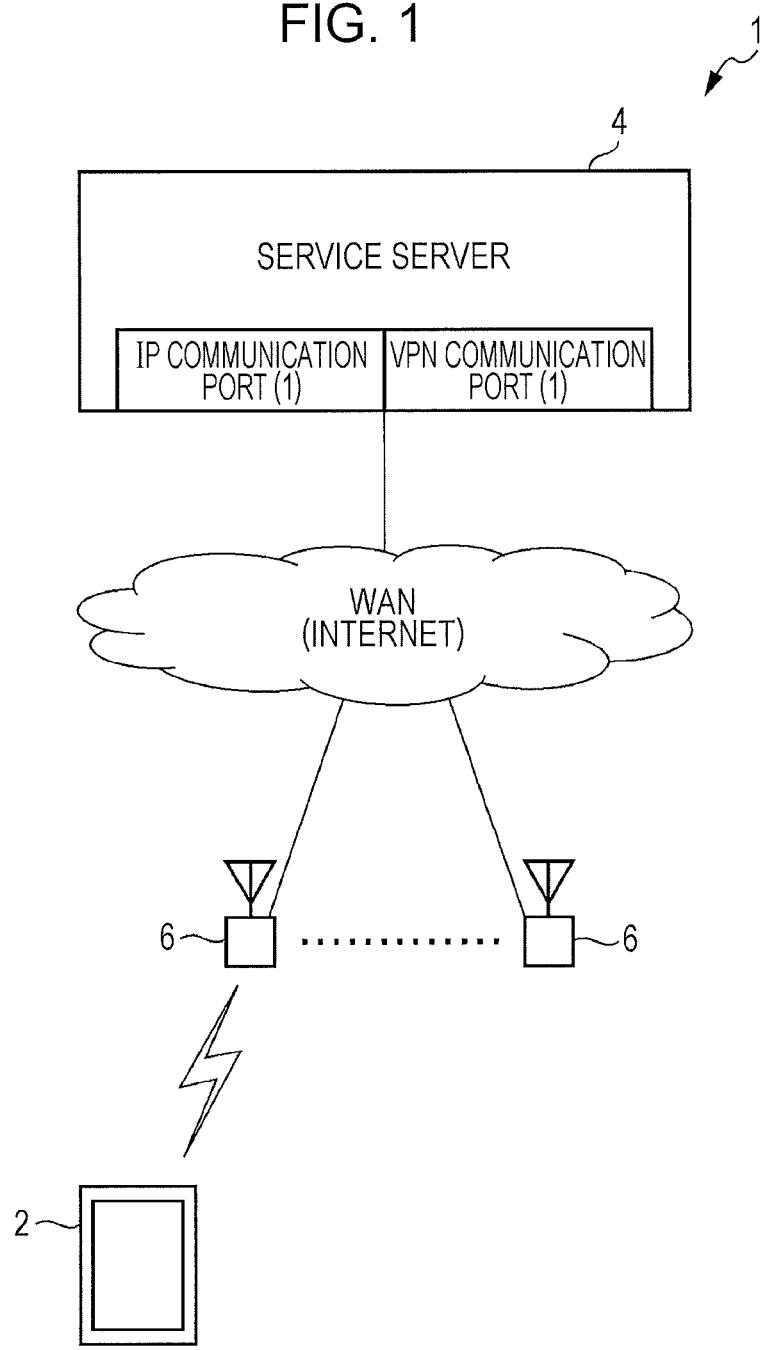
FIG. 1 illustrates an example of the configuration of a service system.

FIG. 1 illustrates an example of the configuration of a service system 1. The service system 1 includes a service server 4, plural base station antennas 6, and a mobile terminal 2. The service server 4 is a server of a mobile virtual network operator (hereinafter referred to as "MVNO") that utilizes a certain communication channel X owned by a network operator, and is connected to a WAN (Wide Area Network), which is a public network. The WAN is also called the Internet. The service server 4 and the mobile terminal 2, which is a customer of the MVNO, communicate with each other via the communication channel X.

The service server 4 provides various information processing services (for example, video streaming distribution services) to the mobile terminal 2, which is a customer of the MVNO. More specifically, in the service server 4, an IP communication port (1) corresponding to a network interface is implemented by an operating system through the use of software. The IP address of the service server 4 is assigned to the IP communication port (1), and data concerning an information processing service is sent to the mobile terminal 2 through the IP communication port (1).

In an exemplary embodiment of the present invention, in the service server 4, VPN (Virtual Private Network) server software is installed, and a VPN communication port (1) is implemented by the VPN server software. An IP address in a virtual private network (hereinafter referred to as "VPN") is assigned to the VPN communication port (1).

The meaning of the VPN communication port (1) will be discussed later.

The base station antennas 6 are antennas for wirelessly connecting the mobile terminal 2 to the WAN.

The mobile terminal 2 is a computer for a customer of the MVNO to use information processing services, and includes a microprocessor, a primary storage, a display, a speaker, a wireless communication interface, and a GPS (Global Positioning System) receiver that receives GPS information according to the necessary. The GPS information indicates the position of the mobile terminal 2. In this example, the mobile terminal 2 is a cellular phone in which the so-called Android (registered) operating system is installed. In the primary storage, the operating system and a communication measurement program distributed by the MVNO via a network are stored. The microprocessor executes various items of information in accordance with the operating system and the communication measurement program. The communication measurement program may be read from a computer-readable information storage medium, such as a DVD (registered)-ROM, and be stored in the primary storage.

The mobile terminal 2 is wirelessly connected to one of the base station antennas 6 (for example, a nearby base station antenna 6) by a wireless communication interface so as to be wirelessly connected to the WAN. The base station antenna 6 connected to the mobile terminal 2 is changed in accordance with the motion of the mobile terminal 2. If the mobile terminal 2 is moving fast, the base station antenna 6 connected to the mobile terminal 2 is frequently changed. Although only one mobile terminal 2 is shown in FIG. 1, there are multiple customers of the MVNO, and in actuality, there are plural mobile terminals 2 that communicate with the service server 4 via the communication channel X.

Figure 2:
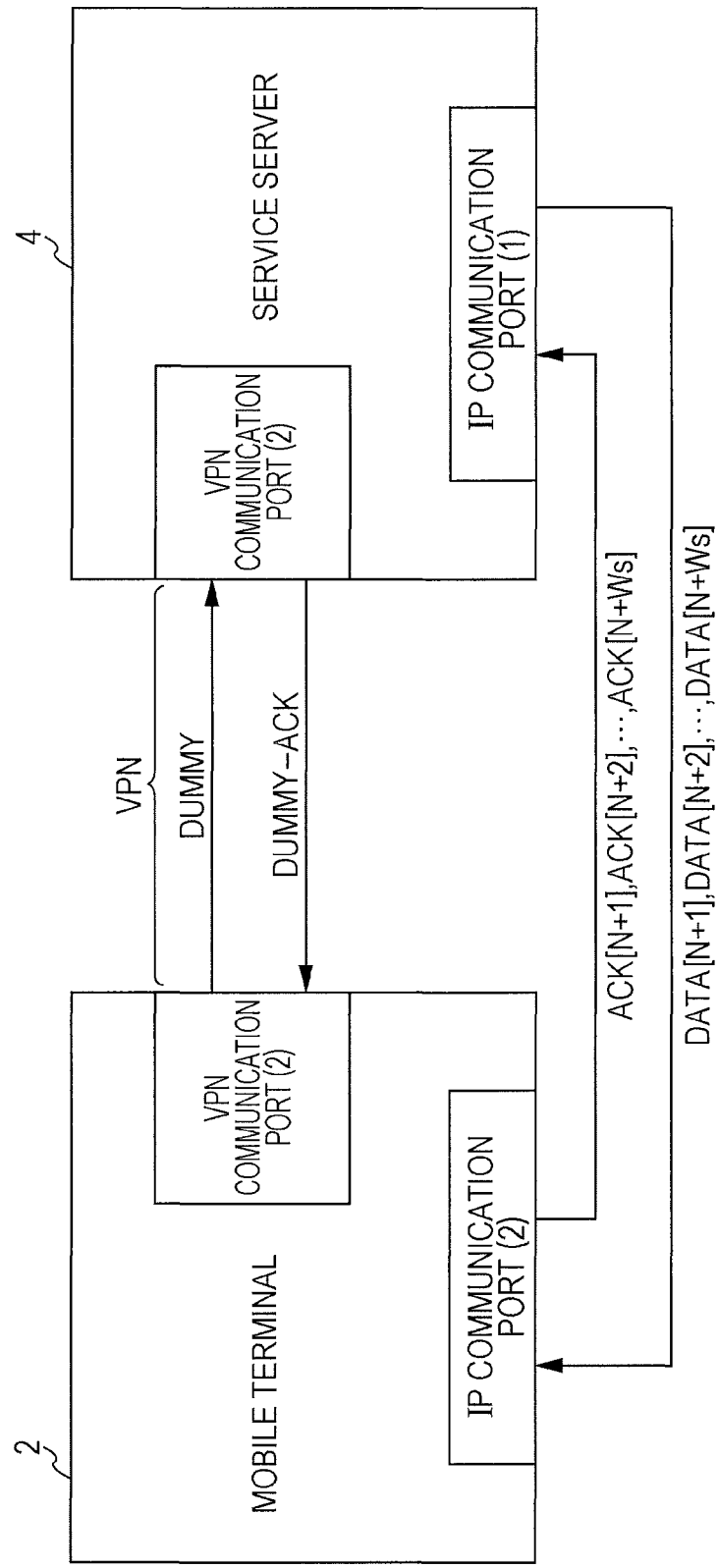
FIG. 2 illustrates communication ports implemented in a mobile terminal.

FIG. 2 illustrates communication ports implemented in the mobile terminal 2 through the use of software. In the present exemplary embodiment, as shown in FIG. 2, in the mobile terminal 2, an IP communication port (2) and a VPN communication port (2) are implemented by the operating system. The IP communication port (2) will first be discussed below.

The IP communication port (2) is a communication port to communicate with the IP communication port (1) shown in FIG. 1, and the IP address of the mobile terminal 2 is assigned to the IP communication port (2). The service server 4 distributes, through the IP communication port (1), a packet set constituted by packets (DATA[N+1], DATA[N+2], . . . , DATA[N+Ws]), the number of which is equivalent to the window size "Ws" of the congestion window, and the mobile terminal 2 receives the packet set distributed from the service server 4 through the IP communication port (2). Upon receiving the packet set, the mobile terminal 2 returns acknowledgement response packets (ACK[N+1], ACK[N+2], . . . , ACK[N+Ws]) corresponding to the individual packets of the received packet set through the IP communication port (2). In this case, the window size "Ws" is indicated by the number of packets. The data size MSS per packet is 1500 bytes.

Figure 3:
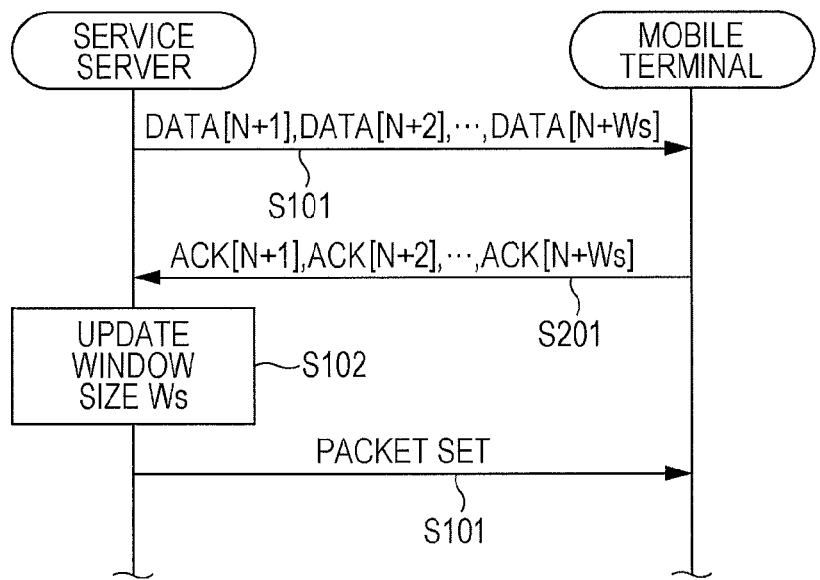
FIG. 3 is a diagram for explaining a control operation of a window size.
Figure 4:
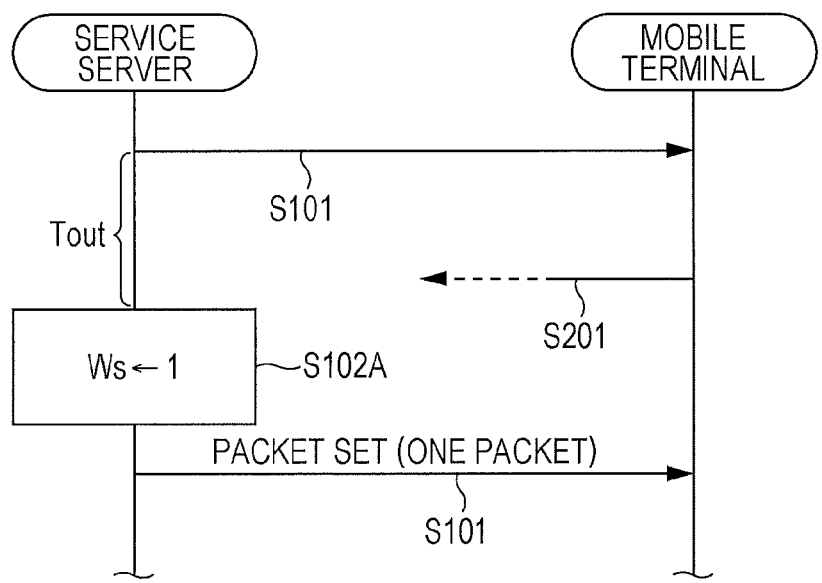
FIG. 4 is a diagram for explaining a control operation of a window size.

The window size "Ws" is not fixed. That is, the service server 4 changes the window size "Ws" appropriately so as to avoid the occurrence of congestion. FIGS. 3 and 4 are diagrams for explaining a control operation of the window size "Ws". As discussed above, when the service server 4 sends a packet set constituted by "Ws" packets (S101), the mobile terminal 2 receives the packet set and returns acknowledgement response packets corresponding to the individual packets of the packet set through the IP communication port (2) (S201).

Then, when the service server 4 receives all acknowledgement response packets sent from the mobile terminal 2, the service server 4 updates the window size "Ws" (S102) and returns to S101, as shown in FIG. 3.

In the present exemplary embodiment, the service server 4 controls the window size by using the TCP Reno method. The window control using the TCP Reno method is described in RFC (Request for Comment) (http://tools.ietf.org/html/rfc2001). This will be explained briefly. If so-called slow start is being performed, that is, if the window size "Ws" is smaller than a threshold "Wth", the service server 4 doubles the window size "Ws" in S102. If so-called congestion avoidance is being performed instead of slow start, that is, if the window size "Ws" is equal to or greater than the threshold "Wth", the service server 4 increments the window size "Ws" by "1" in S102. That is, while slow start is being performed, the window size "Ws" increases exponentially, and after the execution of slow start, while congestion avoidance is being performed, the window size "Ws" increases linearly.

If so-called duplicate ACK occurs, that is, if, concerning one packet, duplicate acknowledgement response packets ACK corresponding to this packet is received, the service server 4 reduces the window size "Ws" in half according to the fast recovery algorithm in S102.

If a retransmission timeout (hereafter referred to as "RTO") occurs, that is, if not all acknowledgement response packets ACK corresponding to individual packets included in a packet set are received even after the lapse of a timeout time Tout after the packet set has been sent, the service server 4 executes step S102A, as shown in FIG. 4, instead of S102 of FIG. 3. That is, in S102A, the service server 4 updates the window size "Ws" to "1". Then, the service server 4 returns to step S101. The threshold "Wth" is updated in the case of the occurrence of RTO. That is, when RTO occurs, the threshold "Wth" is updated to one quarter of the window size "Ws", which is a value upon the occurrence of RTO. The threshold "Wth" is also updated at another timing. More specifically, the threshold "Wth", which is a value before it is updated, is stored, and after the occurrence of RTO, when the window size "Ws" reaches this value, the threshold "Wth" is returned to this value.

Tout is an example of "T" in Claims.

Duplicate ACK or RTO takes place upon the occurrence of congestion. Accordingly, when the window size "Ws", which is a value upon the occurrence of congestion, is indicated by "W", the temporal transition of the number of packets included in a packet set sent from the service server 4 is likely to be represented by the diagram of FIG. 5. The horizontal axis indicates the time, and the vertical axis indicates the number of packets. The thin solid lines indicate the temporal transition of the number of packets, and the thick solid lines indicate the transition of the value of the threshold "Wth". T1 is the time at which RTO occurs. T2 is the time after the lapse of the timeout time Tout after T1, that is, the time at which slow start starts. T3 is the time at which slow start ends, that is, the time at which the window size "Ws" reaches the threshold "Wth". T4 is the time at which the window size "Ws" reaches "W/2", which is one half the window size "W", which is a value when the congestion has occurred, after slow start has ended. As discussed above, upon the occurrence of duplicate ACK, the window size "Ws" is reduced in half, and upon the occurrence of RTO, the window size "Ws" is updated to "1". Not only the updating of the window size "Ws", but also the threshold "Wth" is updated to one quarter of the window size "W", which is a value upon the occurrence of RTO at time T1. Thereafter, slow start is performed from time T2 to time T3, and the window size "Ws" increases exponentially until it reaches the threshold "Wth". After T3, congestion avoidance is performed, and the window size "Ws" increases linearly. At time T4, when the window size "Ws" reaches the threshold "Wth", which is a value before it is updated, that is, one half the window size "W" upon the occurrence of congestion, the threshold "Wth" is returned to the value before it is updated.

The period from T2 to T3 is called a slow start period, while the period from T3 to T4 is called a recovery period.

As discussed above, the number of packets is likely to change. If the length of the slow start period "T3−T2" is indicated by $T_{slow}$, the following mathematical equation holds true.

$$2^{T_{slow}} = W/4 \qquad \text{[Math. 1]}$$

Accordingly, if the approximate update interval $RTT_{ref}$ of the window size "Ws" is used as a time unit, $T_{slow}$ is approximated as follows.

$$T_{slow} \sim RTT_{ref} \cdot \log_2 \frac{W}{4} \quad \text{[Math. 2]}$$

If the total number of packets which are sent during the slow start period is indicted by $P_{slow}$, $P_{slow}$ is expressed by the following mathematical equation.

$$P_{slow} = \sum_0^{W/4} 2^x \quad \text{[Math. 3]}$$

Accordingly, $P_{slow}$ is expressed as follows.

$$P_{slow} = \frac{W}{4} - 1 \quad \text{[Math. 4]}$$

If the length "T4−T3" of the recovery period is indicated by $T_{recovery}$, $T_{recovery}$ is approximated as follows by using $RTT_{ref}$.

$$T_{recovery} \sim RTT_{ref} \cdot \frac{W}{4} \quad \text{[Math. 5]}$$

If the total number of packets which are sent during the recovery period is indicted by $P_{recovery}$, $P_{recovery}$ is determined as follows from the formula for determining the area of a trapezoid.

$$P_{recovery} = \frac{1}{2} \cdot \left(\frac{W}{2} + \frac{W}{4}\right) \cdot \frac{W}{4} - 1 \quad \text{[Math. 6]}$$

$$\therefore P_{recovery} = \frac{3}{32} \cdot W^2 - 1$$

Accordingly, the length of $T_{total}$ of a period from T4 to T1 (hereinafter referred to as a "RTO period") and the total amount of data $P_{total}$ which has been sent during the RTO period are approximated as follows.

$$T_{total} \sim T_{out} + RTT_{ref} \cdot \left(\log_2 \frac{W}{4} + \frac{W}{4}\right) \quad \text{[Math. 7]}$$

$$P_{total} \sim MSS \cdot \left(\frac{W}{4} + \frac{3}{32} \cdot W^2 - 2\right)$$

Figure 5:
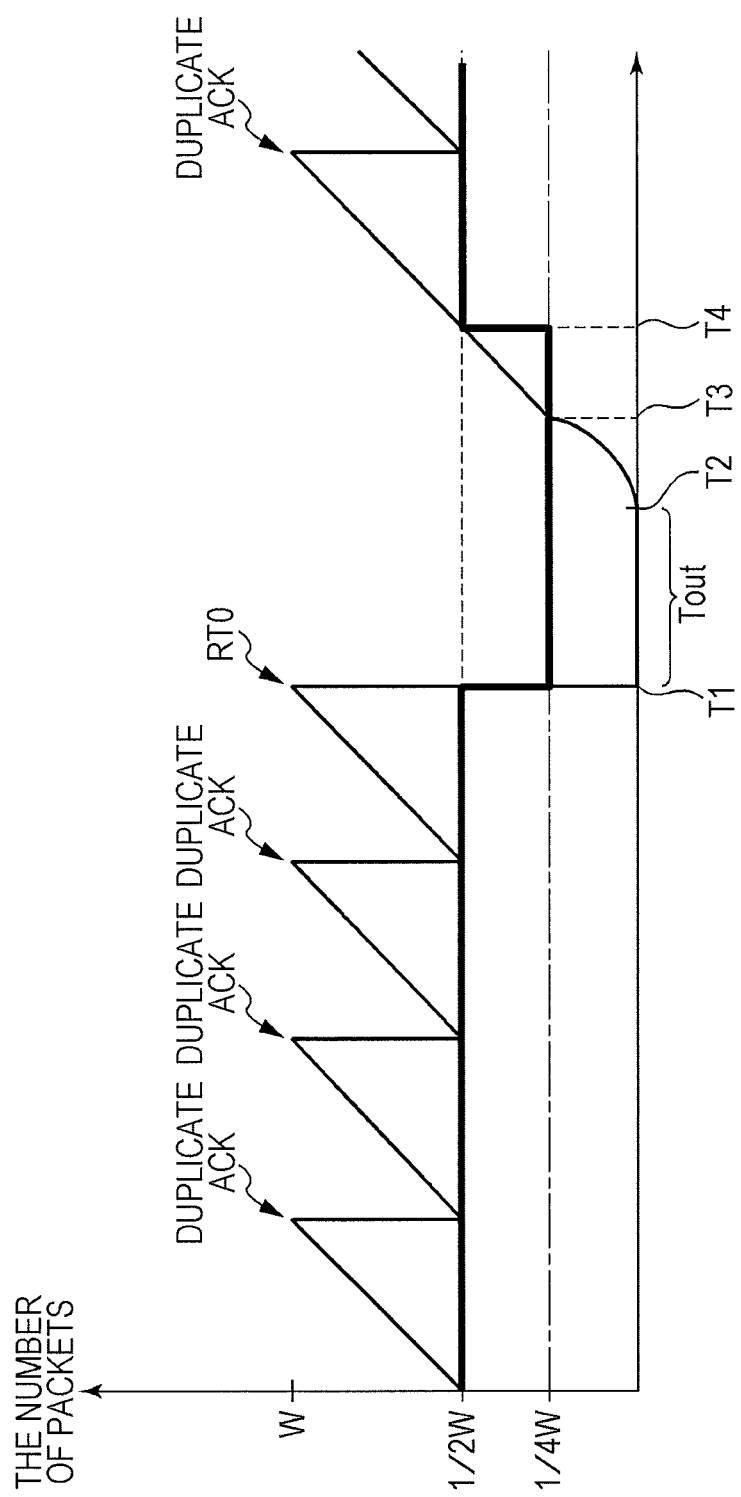
FIG. 5 illustrates an example of the temporal transition of the number of packets.

FIG. 5 shows that, during the period from when the window size "Ws" is "W/2" until when the window size "Ws" reaches "W", packet loss may have occurred once. Accordingly, the packet loss ratio p is approximated as follows.

$$p \sim \frac{1}{\left(\frac{W}{2} \cdot \left(\frac{W}{2} + W\right) \cdot \frac{1}{2}\right)} \quad \text{[Math. 8]}$$

$$\therefore p \sim \frac{32}{3W^2}$$

Thus, the window size "W" upon the occurrence of congestion is approximated as follows.

$$W \sim \sqrt{\frac{32}{3p}} \quad \text{[Math. 9]}$$

Thus, $T_{total}$ and $P_{total}$ are expressed as follows by using the packet loss ratio p.

$$T_{total} \sim T_{out} + RTT_{ref} \cdot \left(\frac{1}{2}\log_2 \frac{2}{3p} + \sqrt{\frac{2}{3p}}\right) \quad \text{[Math. 10]}$$

$$P_{total} \sim MSS \cdot \left(\sqrt{\frac{2}{3p}} + \frac{1}{p}\right)$$

The VPN communication port (2) will now be described below. The VPN communication port (2) is a communication port for communicating with the VPN communication port (1) through a VPN, and an IP address in a VPN is assigned to the VPN communication port (2). The VPN communication port (2) is not used for receiving information processing services, but for obtaining a round-trip time in the communication channel X. That is, the mobile terminal 2 repeatedly sends dummy packets DUMMY from the VPN communication port (2).

Figure 6:
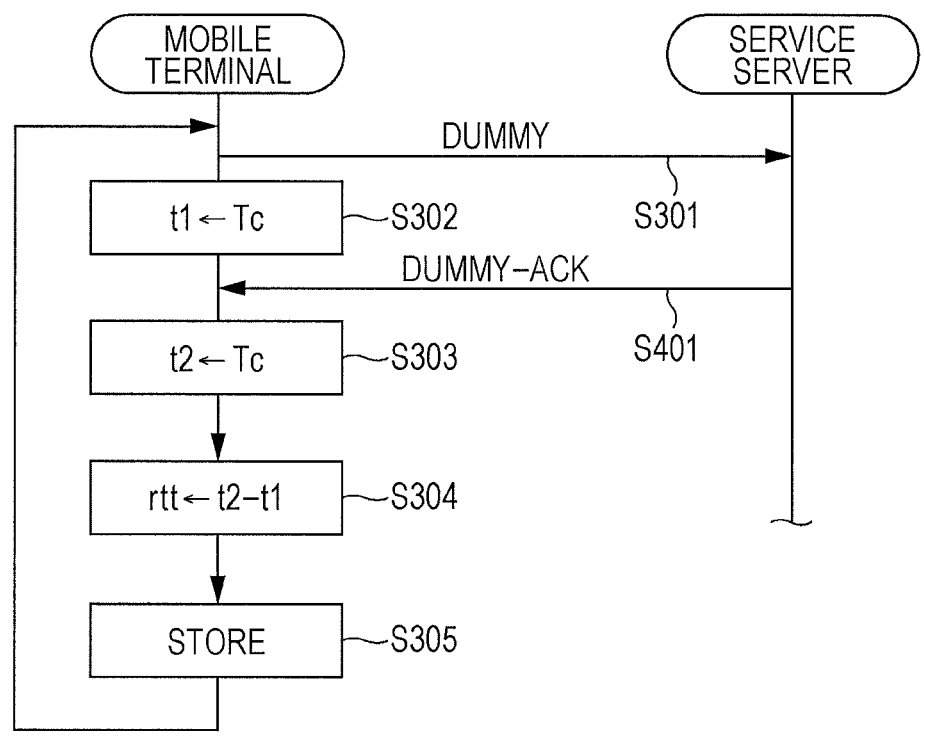
FIG. 6 is a diagram for explaining communication between VPN communication ports.

FIG. 6 is a diagram for explaining communication between the VPN communication port (2) and the VPN communication port (1). First, the mobile terminal 2 (more precisely, the microprocessor of the mobile terminal 2) sends a dummy packet DUMMY from the VPN communication port (2) (S301), and sets the value of a parameter t1 to a current time Tc (S302). After the dummy packet DUMMY has been sent, an acknowledgement response packet DUMMY-ACK is returned from the service server 4, which has received the dummy packet DUMMY (S401). Upon receiving the acknowledgement response packet DUMMY-ACK, the microprocessor of the mobile terminal 2 sets the value of a parameter t2 to the current time Tc (S303), and calculates the time period from the time indicated by the parameter t1 to the time indicated by the parameter t2 as a round-trip time rtt (S304).

Figure 7:
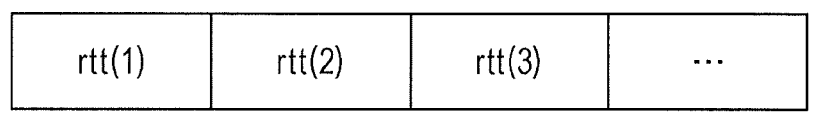
FIG. 7 illustrates an example of an rtt string.

Then, the microprocessor of the mobile terminal 2 stores the rtt calculated in S304 in the primary storage as a final element of a data string of the round-trip time rtt (hereinafter referred to as a "rtt string") (S305), and returns to S301. For example, if "L (L is 0 or a positive integer)" round-trip times rtt are included in the rtt string, the rtt calculated in S304 is stored in the primary storage as the "L+1"-th element of the rtt string in S305. An example of the rtt string is shown in FIG. 7. In the present exemplary embodiment, if duplicate ACK occurs (if duplicate DUMMY-ACK is received), a predetermined flag value is appended to the rtt obtained in S304.

In this mobile terminal 2, on the basis of this rtt string, the estimate value BW of the bandwidth (the amount of data to be communicated per unit time) in the communication channel X is calculated on a regular basis and is sent to the service server 4. The service server 4 performs, for example, packet shaping, on the basis of the estimate value BW received from the mobile terminal 2 so as to appropriately adjust the amount of data per unit time which will be sent to the communication channel X.

Figure 8:
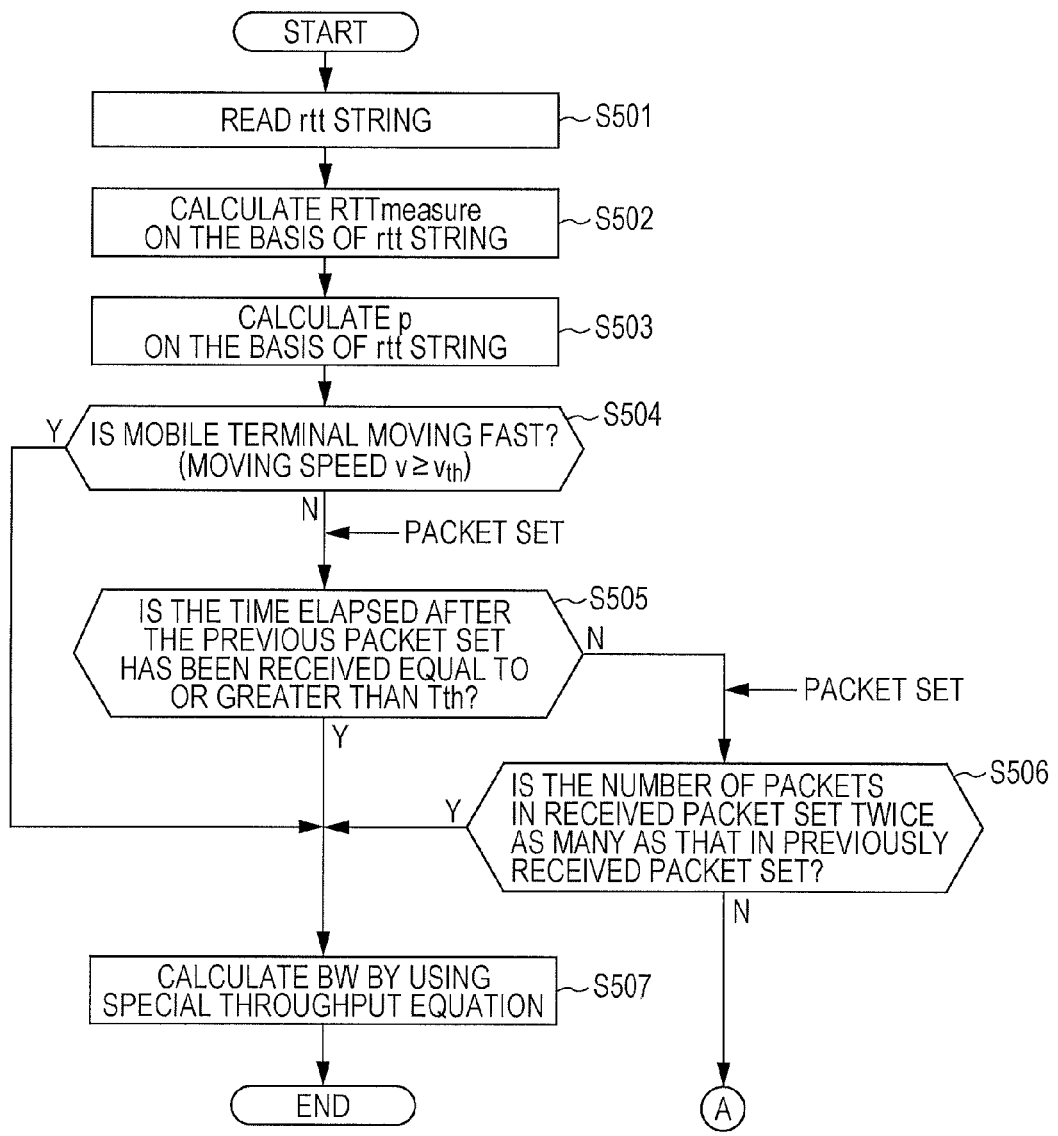
FIG. 8 is a flowchart illustrating processing executed in a mobile terminal.
Figure 9:
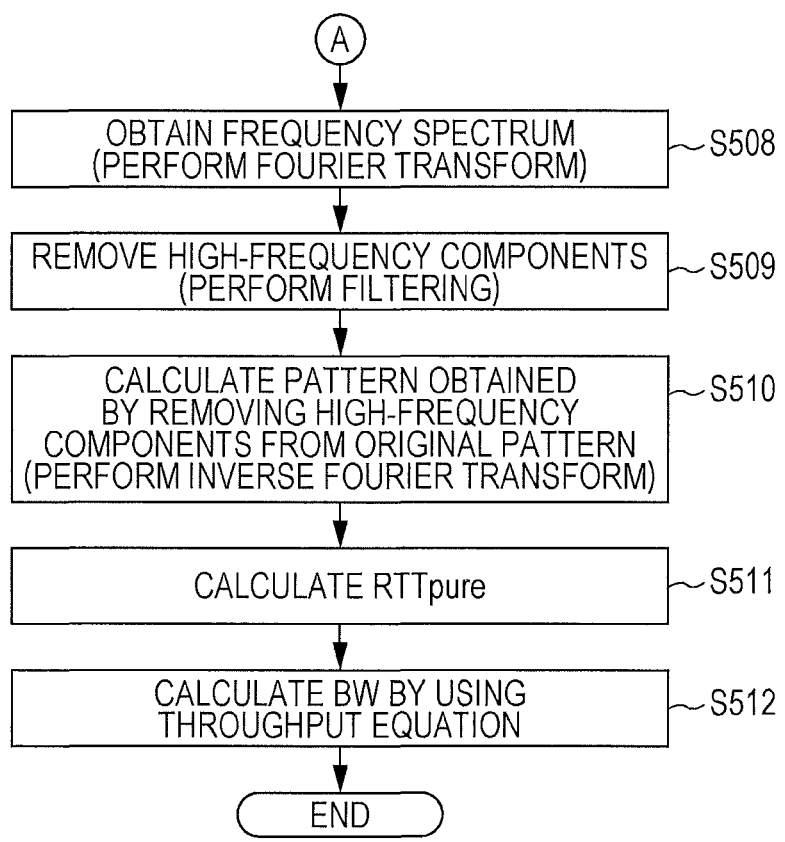
FIG. 9 is a flowchart illustrating processing executed in a mobile terminal.

FIGS. 8 and 9 are flowcharts illustrating processing for calculating the estimate value BW executed by the microprocessor of the mobile terminal 2 on a regular basis. First, the microprocessor (RTT obtaining unit) reads an rtt string stored in the primary storage (S501). Then, the microprocessor (RTT obtaining unit) calculates a measurement value $RTT_{measure}$ of a round-trip time in the communication channel X on the basis of the rtt string (S502). In the present exemplary embodiment, in S502, the microprocessor calculates the average of all rtts in the rtt string as $RTT_{measure}$. $RTT_{measure}$ is an example of "RTT" recited in Claims.

The microprocessor (loss ratio obtaining unit) also obtains a measurement value p of a packet loss ratio in the communication channel X (S503). There are various methods for obtaining the measurement value p. In the present exemplary embodiment, the microprocessor calculates the measurement value p on the basis of the rtt string. More specifically, in S503, the microprocessor calculates, as the measurement value p, the ratio of the number of rtts to which the above-described predetermined flag value is appended to the total number of rtts in the rtt string.

Then, the microprocessor executes S504 and subsequent steps so as to calculate the estimate value BW.

It seems appropriate to calculate the estimate value BW by using the following well-known throughput equation.

$$BW = C \cdot \frac{MSS}{RTT_{measure}} \cdot \frac{1}{p^k} \qquad [\text{Math. 11}]$$

"C" and "k" are given constants.

However, under the circumstances where RTO is occurring, the throughput equation does not hold true. The reason for this is as follows. While RTO is occurring, packet sending is not performed. Accordingly, the round-trip time measured while RTO is occurring is very different from $RTT_{measure}$. Thus, if the above-described throughput equation is used under the circumstances where RTO is occurring, the resulting estimate value BW is much smaller than the actual bandwidth.

Figure 10:
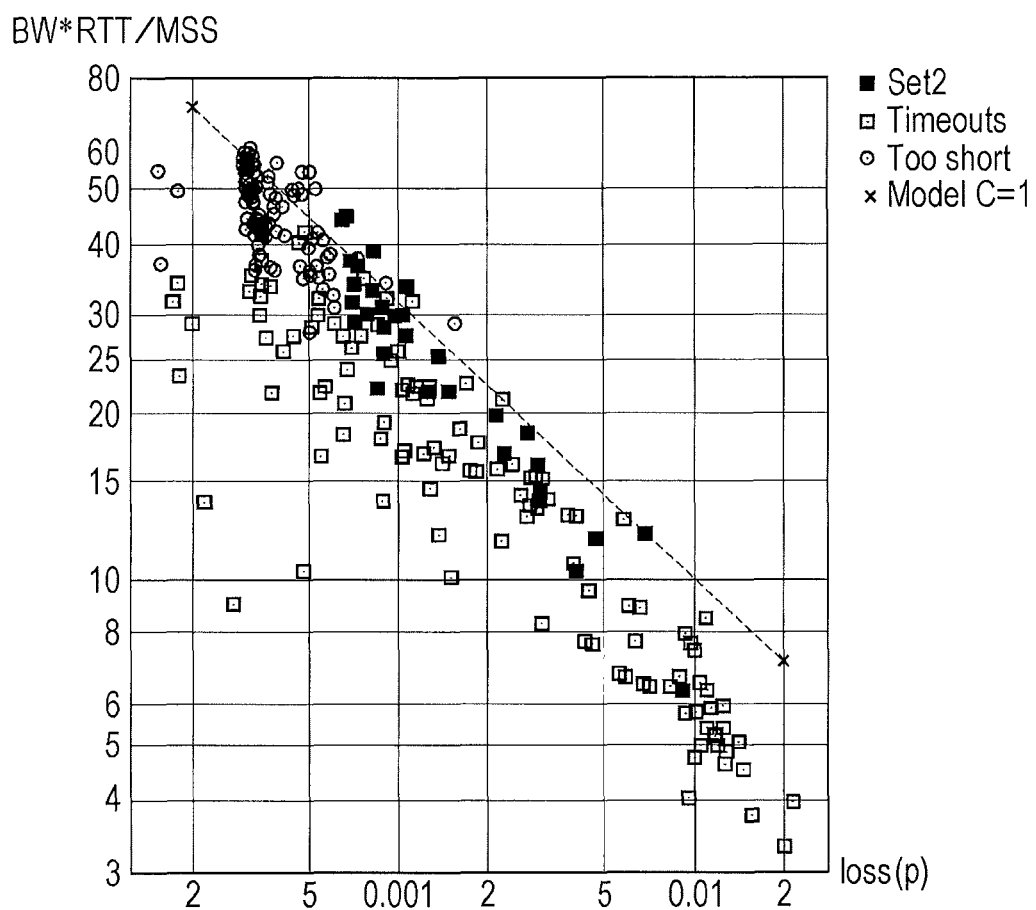
FIG. 10 illustrates a problem in using a throughput equation.

FIG. 10 is a graph for explaining the problem in using the throughput equation, and illustrates the relationship between "$BW \times (RTT_{measure}/MSS)$," and p under the circumstances where RTO is occurring. The vertical axis indicates the value of "$BW \times (RTT_{measure}/MSS)$," on a logarithmic scale, and the horizontal axis indicates the value of p on a logarithmic scale. The outlined squares indicate the relationships between "$BW \times (RTT_{measure}/MSS)$," and p upon the occurrence of RTO. The broken line indicates the relationship between "$BW \times (RTT_{measure}/MSS)$" and p obtained by using the throughput equation. As shown in FIG. 10, the values of "$BW \times (RTT_{measure}/MSS)$" are much lower than those on the broken line upon the occurrence of RTO.

Thus, in this mobile terminal 2, in accordance with whether or not RTO is occurring, that is, whether or not a RTO occurrence condition is satisfied, the mathematical equation used for calculating the estimate value BW is changed. That is, in this mobile terminal 2, if the RTO occurrence condition is not satisfied, the estimate value BW is calculated by using the above-described throughput equation. If the RTO occurrence condition is satisfied, the estimate value BW is calculated by using the following special throughput equation including the timeout time Tout.

$$BW = \frac{MSS \cdot \left(\sqrt{\frac{2}{3P}} + \frac{1}{p}\right)}{T_{out} + RTT_{measure} \cdot \left(\frac{1}{2} \cdot \log_2 \frac{2}{3p} + \sqrt{\frac{2}{3p}}\right)} \qquad [\text{Math. 12}]$$

The RTO occurrence condition is satisfied if any one of the following conditions (1) through (3) is met. That is, if any one of the conditions (1) through (3) is met, it is assumed that RTO is occurring.

Condition (1): the mobile terminal 2 is moving fast (the base station antenna 6 connected to the mobile terminal 2 is frequently changed).

Condition (2): after the lapse of a reference time $T_{th}$ (for example, $T_{th}$ is three seconds) or longer after a packet set has been received, the subsequent packet set is received.

Condition (3): the number of packets in a received packet set is twice as many as that in the previously received packet set (slow start is being performed).

More specifically, the microprocessor executes the following processing in S504 and in the subsequent steps. That is, in S504, the microprocessor (determining unit) determines whether or not the mobile terminal 2 is moving fast. That is, in S504, the microprocessor calculates the moving speed v of the mobile terminal 2 on the basis of GPS information which is received by the GPS receiver when necessary, and determines whether or not the moving speed v is equal to or greater than a threshold $v_{th}$ (S504). In S504, it is determined whether or not the condition (1) is met.

In the mobile terminal 2, every time a packet set is received, the time elapsed after this packet set has been received is measured. If the mobile terminal 2 is not moving fast (N in S504), the microprocessor (determining unit) monitors the IP communication port (2). Then, if the IP communication port (2) has received a packet set, the microprocessor determines whether or not the time elapsed after the previous packet set has been received is equal to or greater than the reference time $T_{th}$ (S505). In S505, it is determined whether or not the condition (2) is met.

If the time elapsed after the previous packet set has been received is smaller than the reference time $T_{th}$ (N in S505), the microprocessor stores the number of packets in the received packet set in the primary storage and monitors the IP communication port (2). Then, if the IP communication port (2) has received a packet set, the microprocessor (determining unit) determines whether or not the number of packets in the received packet set is twice as many as that stored in the primary storage (S506). In S506, it is determined whether or not the condition (3) is met.

If an affirmative determination result is obtained in S504 (Y in S504), or if an affirmative determination result is obtained in S505 (Y in S505), or if an affirmative determination result is obtained in S506 (Y in S506), the microprocessor (calculating unit) calculates the estimate value BW by using the above-described special throughput equation (S507), and sends the calculated estimate value BW to the service server 4.

On the other hand, if an affirmative determination result is not obtained in either of S504, S505, and S506 (N in S506), it is likely that RTO is not occurring. Then, in this case, the microprocessor (calculating unit) calculates the estimate value BW by using the above-described throughput equation and sends the calculated estimate value BW to the service server 4. In the present exemplary embodiment, however, the microprocessor uses $RTT_{pure}$, which will be discussed below, instead of $RTT_{measure}$, when calculating the estimate value BW by using the above-described throughput equation.

That is, the microprocessor performs Fourier transform on a transition pattern of rtts in an rtt string (hereinafter referred to as the "original pattern") (S508), thereby obtaining a frequency spectrum. Then, the microprocessor performs filtering so as to remove high-frequency components from the frequency spectrum (S509). That is, the microprocessor removes frequency components of a predetermined reference frequency $f_{ref}$ or higher from the frequency spectrum.

Then, the microprocessor performs inverse Fourier transform on the frequency spectrum subjected to filtering (S510) so as to calculate a pattern obtained by removing the high-frequency components from the original pattern. Then, the microprocessor calculates the above-described $RTT_{pure}$ on the basis of the pattern obtained in S510 (S511). In this case, in S511, the microprocessor calculates the time average of the pattern obtained in S510 as $RTT_{pure}$.

Then, the microprocessor calculates the estimate value BW by using the above-described throughput equation (S512), and sends the calculated estimate value BW to the service server 4. In the present exemplary embodiment, $RTT_{pure}$ is used instead of $RTT_{measure}$. However, $RTT_{measure}$ may be used.

Exemplary embodiments of the present invention are not restricted to the above-described exemplary embodiment.

For example, the base station antennas 6 may be wireless access points.

In S507, the microprocessor (calculating unit) may use the above-described $RTT_{pure}$ instead of the above-described $RTT_{measure}$ when calculating the estimate value BW by using the above-described special throughput equation. In this case, $RTT_{pure}$ is an example of the measurement value "RTT" recited in Claims.

The microprocessor (calculating unit) may execute step S507 only when affirmative determination results are obtained in all of S504, S505, and S506. That is, it may be determined that the RTO occurrence condition is satisfied if all of the conditions (1) through (3) are met.

Instead of executing all of S504, S505, and S506, only some of S504, S505, and S506 may be executed. For example, only two of the three steps may be executed, or one of the three steps may be executed. For example, if only S504 and S505 are executed, when one of "the conditions (1) and (2)", instead of one of "the above-described conditions (1) through (3)", is met, it is determined that the RTO occurrence condition is satisfied. For example, if only S505 is executed, when the condition (2), instead of one of the above-described conditions (1) through (3), is met, it is determined that the RTO occurrence condition is satisfied.

In S505, instead of determining whether or not the time elapsed after the previous packet set has been received is equal to or greater than the reference time $T_{th}$, the microprocessor (determining unit) may determine whether or not the number of packets in a currently received packet set is "1". That is, "the reception of a packet set including only one packet" may be set as the condition (2). The reason for this is that, if RTO occurs, the window size "Ws" is set to be "1".

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A bandwidth measuring device which communicates, via a public network, with a server which distributes a packet set by changing a window size of a congestion window, the packet set being constituted by packets, the number of which is equivalent to the window size, comprising:

a RTT obtaining unit, executed by a microprocessor, to obtain a measurement value of a round-trip time in a communication channel used for communication between the bandwidth measuring device and the server;

a loss ratio obtaining unit, executed by the microprocessor, to obtain a measurement value of a packet loss ratio in the communication channel;

a receiving unit comprising a communication port that receives the packet set distributed from the server;

a returning unit comprising a communication port that returns, when the packet set distributed from the server is received, an acknowledgement response packet corresponding to each of packets included in the packet set to the server;

a first determining unit, executed by the microprocessor, to determine whether or not a retransmission timeout occurrence condition for determining whether or not a retransmission timeout is occurring is satisfied; and a calculating unit, executed by the microprocessor, to calculates an estimate value of a bandwidth in the communication channel, on the basis of a determination result of the first determining unit, wherein:

when the retransmission timeout occurrence condition is satisfied, the calculating unit calculates the estimate value of the bandwidth by using a first mathematical equation including the measurement value obtained by the RTT obtaining unit, the measurement value obtained by the loss ratio obtaining unit, a given retransmission timeout time, and a data size per packet, the server changes the window size by using a TCP Reno method; and the first mathematical equation is expressed by:

$$BW = \frac{MSS \cdot \left(\sqrt{\frac{2}{3p}} + \frac{1}{p}\right)}{T + RTT \cdot \left(\frac{1}{2} \cdot \log_2 \frac{2}{3p} + \sqrt{\frac{2}{3p}}\right)}$$

where the estimate value of the bandwidth is represented by BW, the measurement value obtained by the RTT obtaining unit is represented by RTT, the measurement value obtained by the loss ratio obtaining unit is represented by p, the timeout time is represented by T, and the data size is represented by MSS.

2. The bandwidth measuring device according to claim 1, further comprising:

a second determining unit, executed by the microprocessor, to determine, when the packet set distributed from the server is received, whether or not a time elapsed after a packet set previously distributed from the server has been received is equal to or greater than a reference time, wherein the first determining unit determines whether or not the retransmission timeout occurrence condition is satisfied, on the basis of whether or not the time elapsed after the packet set previously distributed from the server has been received is equal to or greater than the reference time.

3. The bandwidth measuring device according to claim 1, further comprising:
a second determining unit, executed by the microprocessor, to determine, when the packet set distributed from the server is received, whether or not the number of packets in the received packet set is twice as many as the number of packets in a packet set previously received from the server,
wherein the first determining unit determines whether or not the retransmission timeout occurrence condition is satisfied, on the basis of whether or not the number of packets in the received packet set is twice as many as the number of packets in the packet set previously received from the server.

4. The bandwidth measuring device according to claim 1, further comprising:
a second determining unit, executed by the microprocessor, to determine whether or not the bandwidth measuring device is moving at a moving speed that satisfies a fast movement condition,
wherein the first determining unit determines whether or not the retransmission timeout occurrence condition is satisfied, on the basis of whether or not the bandwidth measuring device is moving at the moving speed that satisfies the fast movement condition.

5. The bandwidth measuring device according to claim 2, further comprising:
a third determining unit, executed by the microprocessor, to determine whether or not the bandwidth measuring device is moving at a moving speed that satisfies a fast movement condition,
wherein the first determining unit determines whether or not the retransmission timeout occurrence condition is satisfied, on the basis of whether or not the bandwidth measuring device is moving at the moving speed that satisfies the fast movement condition and whether or not the time elapsed after the packet set previously distributed from the server has been received is equal to or greater than the reference time.

6. The bandwidth measuring device according to claim 3, further comprising:
a third determining unit, executed by the microprocessor, to determine whether or not the bandwidth measuring device is moving at a moving speed that satisfies a fast movement condition,
wherein the first determining unit determines whether or not the retransmission timeout occurrence condition is satisfied, on the basis of whether or not the bandwidth measuring device is moving at the moving speed that satisfies the fast movement condition and whether or not the number of packets in the received packet set is twice as many as the number of packets in the packet set previously received from the server.

7. The bandwidth measuring device according to claim 1, wherein
when the retransmission timeout occurrence condition is not satisfied, the calculating unit calculates the estimate value of the bandwidth by using a second mathematical equation which does not include the retransmission timeout time.

8. A bandwidth measuring device which communicates, via a public network, with a server which distributes a packet set by changing a window size of a congestion window, the packet set being constituted by packets, the number of which is equivalent to the window size, comprising:
a RTT obtaining unit, executed by a microprocessor, to obtain a measurement value of a round-trip time in a communication channel used for communication between the bandwidth measuring device and the server;
a loss ratio obtaining unit, executed by the microprocessor, to obtain a measurement value of a packet loss ratio in the communication channel;
a receiving unit comprising a communication port that receives the packet set distributed from the server;
a returning unit comprising a communication port that returns, when the packet set distributed from the server is received, an acknowledgement response packet corresponding to each of packets included in the packet set to the server;
a first determining unit, executed by the microprocessor, to determine whether or not a retransmission timeout occurrence condition for determining whether or not a retransmission timeout is occurring is satisfied;
a calculating unit, executed by the microprocessor, to calculate an estimate value of a bandwidth in the communication channel, on the basis of a determination result of the first determining unit; and
a second determining unit, executed by the microprocessor, to determine, when the packet set distributed from the server is received, whether or not a time elapsed after a packet set previously distributed from the server has been received is equal to or greater than a reference time,
wherein:
the first determining unit determines whether or not the retransmission timeout occurrence condition is satisfied, on the basis of whether or not the time elapsed after the packet set previously distributed from the server has been received is equal to or greater than the reference time, and
when the retransmission timeout occurrence condition is satisfied, the calculating unit calculates the estimate value of the bandwidth by using a first mathematical equation including the measurement value obtained by the RTT obtaining unit, the measurement value obtained by the loss ratio obtaining unit, a given retransmission timeout time, and a data size per packet.

9. The bandwidth measuring device according to claim 8, further comprising:
a third determining unit, executed by the microprocessor, to determine whether or not the bandwidth measuring device is moving at a moving speed that satisfies a fast movement condition,
wherein the first determining unit determines whether or not the retransmission timeout occurrence condition is satisfied, on the basis of whether or not the bandwidth measuring device is moving at the moving speed that satisfies the fast movement condition and whether or not the time elapsed after the packet set previously distributed from the server has been received is equal to or greater than the reference time.

10. A bandwidth measuring device which communicates, via a public network, with a server which distributes a packet set by changing a window size of a congestion window, the packet set being constituted by packets, the number of which is equivalent to the window size, comprising:
a RTT obtaining unit, executed by a microprocessor, to obtain a measurement value of a round-trip time in a communication channel used for communication between the bandwidth measuring device and the server;

a loss ratio obtaining unit, executed by the microprocessor, to obtain a measurement value of a packet loss ratio in the communication channel;

a receiving unit comprising a communication port that receives the packet set distributed from the server;

a returning unit comprising a communication port that returns, when the packet set distributed from the server is received, an acknowledgement response packet corresponding to each of packets included in the packet set to the server;

a first determining unit, executed by the microprocessor, to determine whether or not a retransmission timeout occurrence condition for determining whether or not a retransmission timeout is occurring is satisfied on the basis of whether or not the bandwidth measuring device is moving at the moving speed that satisfies the fast movement condition;

a calculating unit, executed by the microprocessor, to calculate an estimate value of a bandwidth in the communication channel, on the basis of a determination result of the first determining unit; and a second determining unit, executed by the microprocessor, to determine whether or not the bandwidth measuring device is moving at a moving speed that satisfies a fast movement condition, wherein:
  the first determining unit determines whether or not the retransmission timeout occurrence condition is satisfied, and
  when the retransmission timeout occurrence condition is satisfied, the calculating unit calculates the estimate value of the bandwidth by using a first mathematical equation including the measurement value obtained by the RTT obtaining unit, the measurement value obtained by the loss ratio obtaining unit, a given retransmission timeout time, and a data size per packet.

\* \* \* \* \*